June 10, 1924.
R. T. OSBURN
SPRAY GUN
Filed April 21, 1923
1,497,462
2 Sheets-Sheet 1
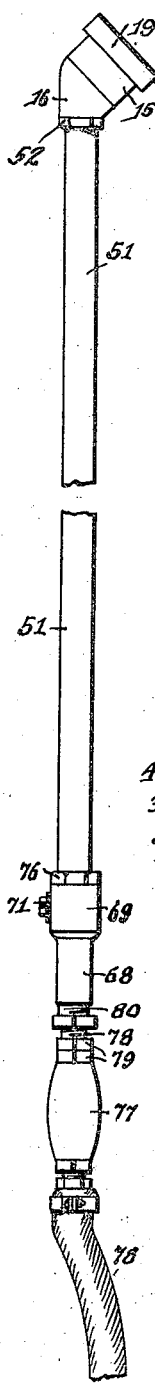
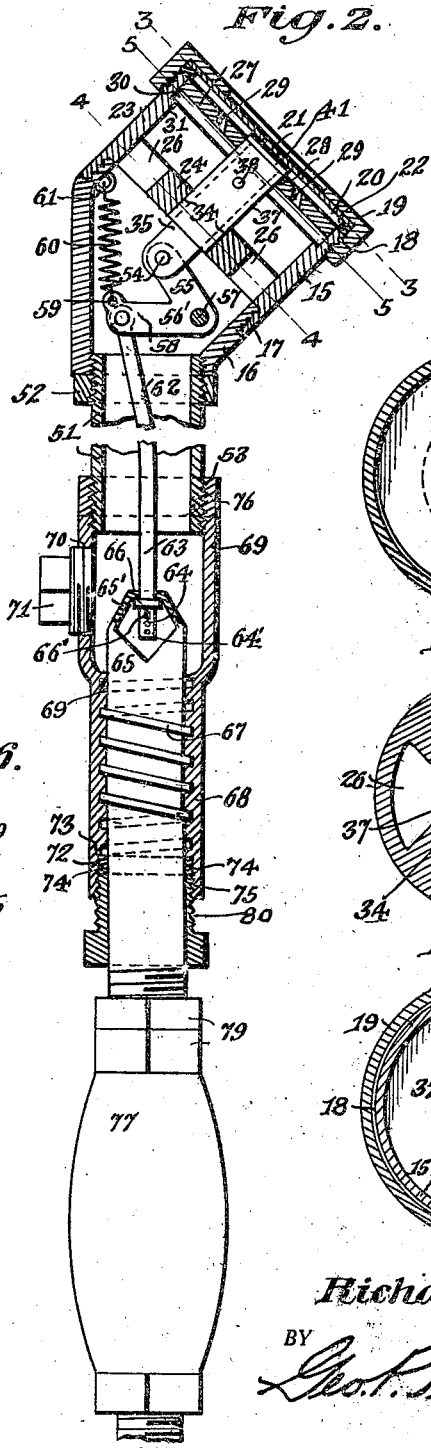
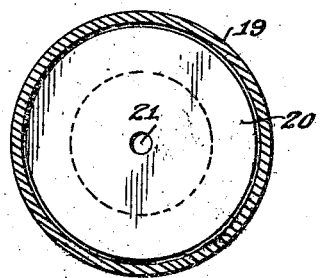
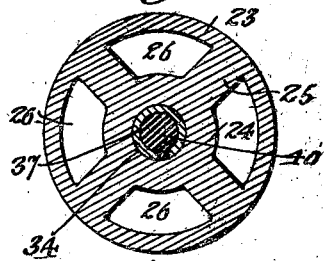
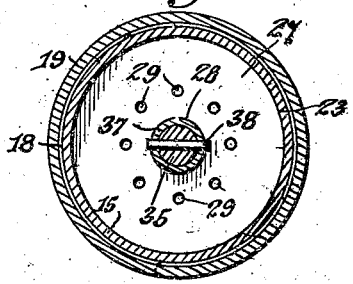
INVENTOR.
Richard T. Osburn,
BY
Geo. P. Kimmel
ATTORNEY.

June 10, 1924.                      1,497,462
R. T. OSBURN
SPRAY GUN
Filed April 21, 1923    2 Sheets-Sheet 2

INVENTOR.
Richard T. Osburn,
BY
Geo. P. Kimmel
ATTORNEY.

Patented June 10, 1924.

1,497,462

UNITED STATES PATENT OFFICE.

RICHARD T. OSBURN, OF BERRYVILLE, VIRGINIA.

SPRAY GUN.

Application filed April 21, 1923. Serial No. 633,715.

*To all whom it may concern:*

Be it known that I, RICHARD T. OSBURN, a citizen of the United States, residing at Berryville, in the county of Clarke and State of Virginia, have invented certain new and useful Improvements in Spray Guns, of which the following is a specification.

This invention relates to a spray gun, of that type embodying an angularly disposed discharge nozzle, and is designed primarily for use for spraying trees, plants, etc., or for any other purposes for which it is found applicable, and the invention has for its object to provide in a manner as hereinafter referred to, a spray gun including means whereby the material to be sprayed is supplied at one end of and conducted through the handle and from there to the discharge nozzle, and whereby the gun can be turned in the hand while being held thereby, to adjust the discharge nozzle to the desired position without any possibility of the feed pipe wrapping or coiling around the handle end of the gun, or in other words, providing in a manner as hereinafter set forth, a spray gun whereby the operator can quickly turn it to adjust the discharge nozzle to the desired position without any inconvenience.

A further object of the invention is to provide in a manner as hereinafter set forth, a spray gun having a nozzle formed of a plurality of detachable sections whereby quick access can be had to the interior of the nozzle when occasion so requires.

A further object of the invention is to provide in a manner as hereinafter referred to, a spray gun including a discharge nozzle, a conducting pipe, a handle element and a controlling means for the nozzle, and whereby access can be had to the controlling means without disconnecting the nozzle or the handle element, and furthermore whereby the controlling means for the nozzle can be removed without disconnecting the nozzle from the conducting pipe.

A further object of the invention is to provide in a manner as hereinafter set forth, a spray gun having means whereby the operator has complete control of the spray at all times without ever releasing the handle element of the gun.

Further objects of the invention are to provide a spray gun, in a manner as hereinafter referred to, which is comparatively simple in its construction, strong, compact, durable, conveniently controlled, enabling the adjusting of the discharge nozzle quickly to the desired position, thoroughly efficient in its use, quickly disassembled when occasion so requires and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a spray gun in accordance with this invention.

Figure 2 is a sectional elevation.

Figure 3 is a section on line 3—3, Figure 2.

Figure 4 is a section on line 4—4, Figure 2.

Figure 5 is a section on line 5—5, Figure 2.

Figure 6 is a sectional detail illustrating the controlling plunger of the discharge nozzle.

Figures 7, 8, 9:
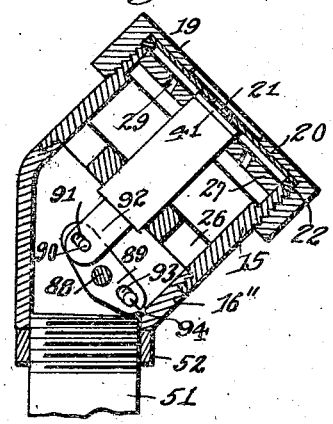
Figures 7, 8, 9, 10, 11 and 12 are vertical sectional views of modified forms of discharge nozzles.

Referring to Figures 2 and 7 of the drawings, the discharge nozzle consists of two sections 15 and 16, the former is cylindrical in contour and the latter flaring. The sections 15 and 16 are detachably connected together, as at 17, and for such purpose the rear end of the section 15 is cutaway on its inner face and with the wall of said cutaway portion threaded. The forward end of the section 16 is reduced and its outer periphery threaded, and the said forward end of the section 16 extends into the rear end of the section 15, and has threaded engagement therewith, as is obvious, and under such conditions the sections 15 and 16 are detachably connected together.

The outer periphery of the section 15, at its forward end, is formed with threads 18, and detachably engaging therewith is a flanged collar 19 which maintains in position a head plate 20, in the form of a disk and which is provided centrally with a discharge orifice 21. Interposed between the disk 20 and the section 15 is a gasket 22, which spaces the disk 20 from the section 15, and furthermore maintains the disk 20 in abutting engagement with the collar 19.

Formed integral with the inner face of the section 15, is a partition element consisting of a rim 23, a hub 24, and a series of radially disposed arms 25, which extend from the hub 24 to the rim 23, and said arms 25 are formed integral with the hub 24 and rim 23. The arms 25 are spaced equidistant with respect to each other thereby providing a series of enlarged openings 26 for the passage of the material to be discharged.

Interposed between the partition element and the disk 20, and arranged in the forward end of the section 15, is a directing plate 27, formed with a centrally disposed opening 28, which is surrounded by a series of inclined ports 29. The opening 28 opposes the discharge orifice 21 and is of greater diameter than the latter. The ports 29 are so set up in the plate 27, being cut through diagonally, to give the spray liquid a whirling motion as it comes against the disk 20.

In Figures 2, 7, 9, 10, 11 and 12, the section 15 has its inner face, at its forward end, cut away as at 30, which provides a shoulder 31, and by this arrangement the inner diameter of the forward part of the section 15 is greater than the inner diameter of the intermediate portion of said section 15, and that portion of larger diameter of the section 15, at the forward end thereof, has arranged therein the direction plate 27, and the thickness of said plate 27 is less than the length of the cutaway portion 30, whereby said plate 27 can shift in the portion 30 when occasion so requires, and in a direction towards and away from the plate 20, but when moving from the plate 20 such movement of the plate 27 will be limited by the shoulder 31.

Referring to Figure 8 of the drawings, the section 15' has its forward end provided with a cutaway portion 32, thereby providing a shoulder 33 and said cutaway portion 32, is of a length equal to the width of the plate 27 whereby the plate 27 is prevented from shifting rearwardly in the section 15, as the cutaway portion 32 and shoulder 33 provide a seat for the plate 27, whereby when the plate 27 is mounted on the shoulder 33, the forward face of the plate 27 will be flush with the forward edge of the section 15.

Referring to Figures 2, 7, 8, 9 and 10, the discharge nozzle includes a plunger for controlling the discharge orifice 21, and the construction of the plunger is more clearly shown in Figure 6. The plunger is mounted in the opening 34, formed by the hub 24 and is of a length to extend through the opening 28 in the plate 27 and to engage against the inner face of the disk 20 for the purpose of closing the orifice 21, and such arrangement is shown in the figures referred to. The plunger consists of a body portion 35, having its rear end bifurcated, as at 36, and inclosing and projecting forwardly from the body portion 35, is a shell 37, secured in position by a transversely extending pin 38. The forwardly projecting portion of the shell 37, in connection with the forward end of the body portion 35, provides a pocket 39, into which extends the shank 40 of a resilient plug 41. The head of the plug 41 is of greater diameter than the shank 40 and bears against the forward edge of the shell 37. The shell 37 does not inclose the rear part of the body portion 35, as the said rear part of the body portion 35 projects rearwardly from the rear end of the shell 37. The shell 37 is of a length so that it will always seat against the wall of the opening 34 formed by the hub 24.

Figures 10, 11, 14:
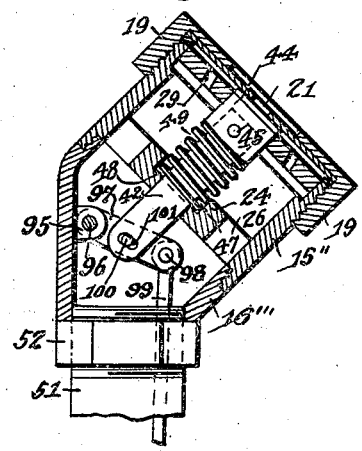
Figure 14 is a sectional elevation of a modified form of controlling means for the plunger.
Figures 12, 13:
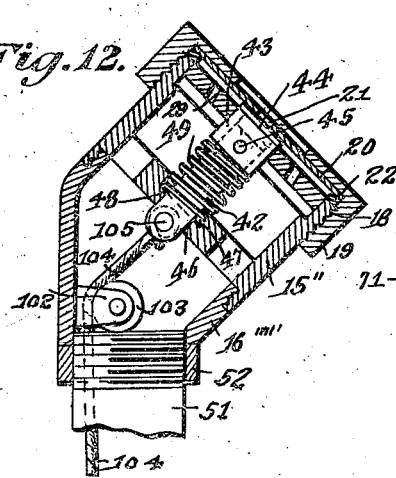
Figure 13 is a fragmentary view, partly in section, of a modified form of connecting the plunger of the discharge nozzle with the shifting means therefor and used in connection with the form shown in Figure 12.

Referring to Figures 11 and 12, the body portion of the plunger is indicated at 42, and which has secured to the forward part thereof, as well as projecting forwardly therefrom, a shell 43 providing a pocket in connection with the body portion 42 and into said pocket extends the shank of a resilient plug 44, which is employed for closing the orifice 21. The shell 43 is secured in position by a pin 45.

In the form shown in Figures 11 and 12, the hub 24 of the partition member, has its opening formed of two different diameters as indicated at 46, 47, thereby providing a shoulder 48. Mounted on the body portion 42, of the plunger, and interposed between the shoulder 48 and the shell 43, is a coiled spring 49, the functions of which is to normally maintain the plunger in position, whereby the plug 44 will close the orifice 21. The body portion 42 of the plunger extends through that portion 46 of smaller diameter of the opening formed by the hub 24, and said body portion 42 projects rearwardly from the partition element.

The section 16 of the nozzle is angle shaped, or substantially in the form of an elbow, whereby the section 15 when secured to the section 16, will be disposed permanently at an angle. The inner face of the rear part of the section 16 is provided with internal threads, as indicated at 50. The manner of setting up the sections 15 and 16, as just stated, applies to the various forms of nozzles as shown.

Extending rearwardly from the section 16, of each of the nozzles is a conducting pipe 51, provided with peripheral threads for engagement with the threads 50, whereby the pipe 51 is detachably connected with the rear end of the section 16. A securing nut 52 has threaded engagement with the pipe 51 and abuts against the rear end of the section 16. The conducting pipe 51 is of substantial length and has its rear end provided with peripheral threads, as indicated at 52, for a purpose to be presently referred to.

Referring to Figure 2 of the drawings, the bifurcated end 36 of the body portion 35 of the plunger has pivotally connected therewith, as at 54, one of the arms 55 of a bell crank lever 56', which is pivotally mounted on a pin 57, carried by the section 16 and arranged rearwardly of the partition element. The other arm of the bell crank lever 56' is indicated as at 58, and is provided with an apertured ear 59, to which is attached one end of a pulling spring 60, and which has its other end connected to an eye 61, carried by the section 16. The function of the spring 60 is to normally retain the plunger in position whereby its plug 41 will close its orifice 21, and when said plunger is shifted to open position with respect to the orifice 21, such movement is had against the action of the spring 60.

Connected to the outer end of the arm 58 of the bell crank lever 57, is the angle shaped end 62, of a shifting rod 63, which extends rearwardly through the conducting pipe 51, as well as projecting from the rear end thereof.

The rear end of the rod 63 is apertured, as at 64, and extends through the skeleton head 65' of a hollow actuating plug 65 for the rod 63. A washer 66 is mounted on the rear end 64' of the rod 63, and said washer 66 is arranged within the skeleton head 65', as well as abuts thereagainst when the rod 63 is shifted when adjusting the plug 65 rearwardly. To retain the washer 66, on the rear end 64 of the rod 63, the said rear end 64' is provided with a cotter pin 66' which extends through any one of the apertures 64. The periphery of the plug 65 is provided with a coarse thread 67, which associates with a means to be presently referred to, for the purpose of shifting the plug 65.

The plug 65, rod 63, bell crank lever 56, and spring 60, provide a controlling means for the plunger, and the rod 63, at its rear end extends into an actuating sleeve which has the plug 65 shiftably engaging therewith. The said actuating sleeve consists of a rear portion 68 and a forward portion 69, the latter being of greater diameter than the former and the said forward portion 69, at its forward end, is provided with internal threads, with which engage the peripheral threads 53 of the conducting pipe 51, whereby the latter is detachably connected to the adjusting sleeve. The inner face of the rear portion 68, of the adjusting sleeve, is provided with a spiral groove 69, into which engages the spiral thread 67, whereby when the sleeve or plug is rotated the plug 65 will be adjusted. The plug 65 projects into the forward portion 69 of the sleeve, and does not engage with the inner face thereof. The forward portion 69 of the adjusting sleeve is formed with an opening 70, having a threaded wall, with which engages a closure plug 71, which when removed permits of disconnecting the rod 63 from the skeleton head 65' and further permits of the adjusting of the washer 66 on the portion 64 of the rod 63.

The rear portion 68 of the adjusting sleeve, has its inner face cutaway, as at 72, to provide a shoulder 73, against which is mounted a resilient gasket 74 which surrounds the plug 65, and the said cutaway portion 72 is provided with threads 75 for a purpose to be presently referred to.

A securing nut 76 engages with the peripheral threads 53 of the conducting pipe 51 and abuts against the forward edge of the forward portion 69 of the adjusting sleeve.

The handle of the gun is indicated at 77, and is hollow. The rear end of the handle 77 is termed an inlet end, and has connected therewith a feed or supply pipe 78 for the spraying solution.

The plug 65 projects rearwardly from the adjusting sleeve, and is connected to the handle 77, by the lock nut 79. Mounted on the rear portion of the plug 65, is a flanged packing gland 80, which engages with the thread 75 and maintains the gasket or packing 74 compressed to prevent leakage.

By turning the handle 77, the plug 65 will be shifted forwardly or rearwardly depending in which direction the handle 77 is turned, and when the handle 77 is turned in the direction to shift the plug 65 rearwardly, the plunger in the discharge nozzle will be moved rearwardly to open the orifice 21 to provide for the discharge of the spraying solution. The spraying solution passes through the handle 77, plug 65, out through the adjusting sleeve, thence through the pipe 51 into the discharge nozzle, that is to say, the rear section 16 thereof, and from the section 16 through the openings 26 into the section 15, then through the ports 29 and out through the orifice 21.

In the modified form shown in Figures 7 and 8, the spring 60 is dispensed with and the bell crank for operating the plunger is indicated at 81, and which has one arm connected to a shifting rod 82.

In the modified form shown in Figure 9, the section 16 of the discharge nozzle, is provided with a lug 83, to which is pivotally connected a link 84, the latter is pivotally connected, as at 85 to the bifurcated end 36 of the plunger, and said link 84 has its other end pivotally connected, as at 86, to a shifting rod 87.

In the modified form shown in Figure 10, the section 16 of the discharge nozzle, is provided with a pivot 88, upon which is loosely mounted a link 89, the latter has one end provided with a pin 90 and its other end slotted as at 93. The rear end 92 of the plunger 41 shown in Fig. 10, is formed with a slot 91 and into which extends the pin 90. Extending into the slot 93 is a pin 94 which is carried on the forward end of the shifting rod or the plunger.

Referring to Figure 11, the section 16 of the discharge nozzle, is provided with an apertured ear 95 to which is pivotally connected, as at 96, one end of an inclined link 97 and the other end of the link 97 is pivotally connected, as at 98 to a shifting rod 99. The link 97 intermediate its ends, is provided with a pin 100 which engages in the slot 101, formed on the rear end of the plunger body 42.

Referring to Figures 12 and 13, the section 16, of the discharge nozzle is provided with a bracket 102, carrying a pulley 103, over which passes a flexible member 104, having its forward end connected to the rear end of the plunger, as at 105. The rear end of the flexible member 104, is attached, as at 106, to an eye bolt 107, connected to the skeleton head 65' of the plug 65.

Referring to Figure 14, the plug for shifting or controlling the plunger is indicated at 108, and is provided intermediate its ends with a pin 109, which engages in a double spiral groove 110, formed on the inner face of a sleeve 111, which is secured within the rear portion 112 of the adjusting sleeve which incloses the forward portion of the plug 108. The adjusting sleeve, is formed on its inner face with an annular shoulder, as at 113, and positioned against said shoulder 113 is the forward end of the sleeve 111. A shifting rod is indicated at 114 and is connected to the skeleton head 115 of the plug 108 by washers 116 and a pair of cotter pins 117.

From the foregoing description taken in connection with the accompanying drawings, a construction of spray gun is disclosed which will provide for the discharging of the spraying solution at an angle with respect to the handle element of the gun, and furthermore the gun is conveniently controlled by the operator and which can be adjusted, or shifted or turned while the operator is holding the same, and although the preferred embodiment of the invention is as shown and described, yet it is to be understood that changes in the details of construction can be had without departing from the light of the invention as claimed.

What I claim is:—

1. A spray gun comprising a conducting pipe, an angularly disposed discharge nozzle connected therewith and provided with a plunger for controlling discharge therefrom, a hollow handle member having an inlet at one end thereof, and means connected with said plunger and operated from said handle for controlling discharge from said nozzle, said means including a pair of interengaging hollow elements, one of said elements shiftable within the other and connected with said handle and the other of said elements connected with said conducting pipe, and said means further including a shifting element extending through said conducting pipe.

2. A spray gun comprising a hollow handle member, means for swivelly connecting a supply pipe to one end thereof, a nozzle provided with a discharge orifice and a plunger for controlling the latter, a conducting pipe extended from said nozzle, and means connected with said pipe, said handle and said plunger and operated from the handle for controlling said plunger, said means including tubular means communicating with the handle and with said pipe, said nozzle being angularly disposed with respect to said conducting pipe.

3. A spray gun comprising a hollow handle having means for connecting a supply pipe therewith, a nozzle provided with a discharge pipe and a direction plate and a plunger extending through said plate for controlling discharge through said orifice, a conducting pipe extended from said nozzle, and means connected with said pipe, plunger and handle and operated from the handle for shifting the plunger to open said orifice for discharge, said means including tubular means communicating with the pipe and with the handle, said nozzle being angularly disposed with respect to said conducting pipe.

4. A spray gun comprising a hollow handle having means for connecting a supply pipe therewith, a nozzle provided with a discharge pipe and a direction plate and a plunger extending through said plate for controlling discharge through said orifice, a conducting pipe extended from said nozzle, and means connected with said pipe, plunger and handle and operated from the handle for shifting the plunger to open said orifice for discharge, said means including tubular means communicating with the pipe and with the handle, said nozzle being angularly disposed with respect to said conducting pipe, and said means including a pair of interengaging elements, one shifted within the other.

In testimony whereof, I affix my signature hereto.

RICHARD T. OSBURN.